US012722350B2

(12) United States Patent
Schiavon et al.

(10) Patent No.: US 12,722,350 B2
(45) Date of Patent: Sep. 1, 2026

(54) WORKING STATION FOR DEPOSITION OF ELEMENTARY SEMIFINISHED PRODUCTS FOR BUILDING GREEN TYRES

(71) Applicant: PIRELLI TYRE S.P.A., Milan (IT)

(72) Inventors: Emanuele Luca Schiavon, Milan (IT); Marco Cantu', Milan (IT); Matteo Calderoni, Milan (IT); Lorenzo Avanzini, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 204 days.

(21) Appl. No.: 18/802,760

(22) Filed: Aug. 13, 2024

(65) Prior Publication Data

US 2024/0399690 A1 Dec. 5, 2024

Related U.S. Application Data

(63) Continuation of application No. 17/046,763, filed as application No. PCT/IB2019/053103 on Apr. 16, 2019, now Pat. No. 12,090,720.

(30) Foreign Application Priority Data

Apr. 18, 2018 (IT) ........................ 102018000004656

(51) Int. Cl.
*B29D 30/26* (2006.01)
*B29D 30/20* (2006.01)
*B29D 30/30* (2006.01)

(52) U.S. Cl.
CPC ......... *B29D 30/26* (2013.01); *B29D 30/3028* (2013.01); *B29D 2030/203* (2013.01)

(58) Field of Classification Search
None
See application file for complete search history.

(56) References Cited

U.S. PATENT DOCUMENTS 12,090,720 B2 9/2024 Schiavon et al.
2017/0217020 A1 * 8/2017 Suzuki .................. B25J 9/1692

FOREIGN PATENT DOCUMENTS

EP 0672885 A2 * 9/1995 ............ G01B 5/004
WO WO200035666 A1 * 6/2000

OTHER PUBLICATIONS

Amman. EP0672885A2 ESpaceNet. 1994. (Year: 1994).*
(U.S. Appl. No. 18/802,760) 1.98(d) Certification Statement + List. Date of Dec. 18, 2024. 1 page.

* cited by examiner

*Primary Examiner* — Sedef E Paquette
*Assistant Examiner* — Alexander D Booth
(74) *Attorney, Agent, or Firm* — Steinfl + Bruno LLP

(57) ABSTRACT

A working station including at least one feeding apparatus for feeding an elementary semifinished product, a forming drum, an anthropomorphic robotized arm associated with the forming drum, a control apparatus for sending movement commands to the anthropomorphic robotized arm in order to move the forming drum in a working zone, and a calibration device for calibrating the anthropomorphic robotized arm. The calibration device includes a base plate, a support rotatably mounted on the base plate, and a reference element translatably mounted on the support. The support is positionable in a plurality of first positions relative to the base plate and the reference element is positionable in a plurality of second positions relative to the support and is fixed into one position of the plurality of second positions by inserting at least one pin or screw into one slot of a plurality of slots on the cursor.

6 Claims, 7 Drawing Sheets

125
100a
100b
123
126
131
132
100a
100b
100e
124
100f
V
V
131a
100b
100d
122
130
100a
100
110
100a
100b
121
125
100c
120

WORKING STATION FOR DEPOSITION OF ELEMENTARY SEMIFINISHED PRODUCTS FOR BUILDING GREEN TYRES

CROSS-REFERENCE TO RELATED APPLICATIONS

The present application is a continuation of U.S. patent application Ser. No. 17/046,763 Oct. 9, 2020, which is a U.S. National Stage of International Patent Application No. PCT/IB2019/053103 filed on Apr. 16, 2019, which, in turn, claims priority to Italian Application No. 102018000004656 filed on Apr. 18, 2018.

TECHNICAL FIELD

The present invention relates to a working station for deposition of elementary semifinished products for building green tyres.

BACKGROUND

The present invention also relates to a working station for deposition of elementary semifinished products for building green tyres, which operates in accordance with said method.

A tyre for vehicle wheels generally comprises a carcass structure including at least one carcass ply having respectively opposite end flaps in engagement with respective annular anchoring structures, generally referred to as "bead cores", identified in the zones usually referred to as "beads", having an internal diameter substantially matching a so-called "fitting diameter" of the tyre for fitting it on a respective rim. The tyre also comprises a crown structure including at least one belt strip arranged in a radially outer position relative to the carcass ply, and a tread band which is radially external with respect to the belt strip. Between the tread band and the belt strip(s) a so-called "underlayer" of elastomeric material may be interposed, having properties are suitable for providing a stable union between the belt strip(s) and the same tread band. In addition, respective sidewalls of elastomeric material are applied to the side surfaces of the carcass structure, each extending from one of the side edges of the tread band up to the respective annular anchoring structure to the beads. In tyres of the "tubeless" type, the carcass ply is internally coated with a layer of elastomeric material, preferably a butyl-based one, commonly referred to as "liner", having optimal air tightness properties and extending from one bead to the other.

The term "elastomeric material" refers to a compound comprising at least one elastomeric polymer and at least one reinforcing filler. Preferably, said compound also comprises additives such as, for example, a cross-linking agent and/or a plasticizer. Due to the presence of the cross-linking agent, said material can be cross-linked by heating to form the final product.

The term "elementary semifinished product" refers to a continuous elongated element made of elastomeric material. Preferably, said continuous elongated element comprises one or more reinforcing cords, preferably textile or metallic ones, disposed parallel to each other in the longitudinal direction of the elongated element itself. More preferably, said continuous elongated element is cut to size.

A "component" or "structural component" of a tyre is meant to be any portion of the latter which can perform a specific function, or a part thereof. Tyre components include, for example: liner, underliner, sidewall inserts, bead cores, filler inserts, anti-abrasive layer, sidewalls, carcass ply(ies), belt layer(s), tread band, tread band underlayer, underbelt inserts, etc., or parts thereof.

A "correction function" associated with an anthropomorphic robotized arm is a function that is indicative of a positioning error made by said anthropomorphic robotized arm in a certain working zone, said positioning error being representative of a difference between positions that said anthropomorphic robotized arm should take when executing determined movement commands and corresponding positions actually taken by said anthropomorphic robotized arm when executing said determined movement commands.

A "configuration" of an anthropomorphic robotized arm refers to a set of parameters that define, for each position of the terminal of the anthropomorphic robotized arm, the angles at which the sections or segments of said anthropomorphic robotized arm are arranged and oriented. Typically, a given position of the terminal of an anthropomorphic robotized arm can be obtained with two or more different configurations.

The term "tyre model" refers to a set of geometric characteristics of a tyre, i.e., for example, section width, sidewall height, fitting diameter and/or outside diameter; structural characteristics, i.e., for example, presence of one or two carcass plies, presence or not of sidewall inserts for flat running, number of belt strips, presence of a sidewall-over-tread ("SOT") or tread-over-sidewall ("TOS") structure; and technological characteristics, i.e., for example, type of elastomeric material used for each component, material used for each reinforcing cord, formation of the same.

Document WO00/35666, in the name of the same Applicant, describes a method and an apparatus for forming a tyre by manufacturing the components thereof directly on a rigid toroidal support, the shape of which matches that of the tyre to be obtained. Some components of the tyre are obtained through delivery of an elementary semifinished product from an extruder, to be suitably distributed on the toroidal support as the latter is rotated about its own axis. Simultaneously, the toroidal support, suspended from a robotized arm, is moved in front of the extruder so as to determine the transverse distribution of the elementary semifinished product and then form therewith a plurality of circumferential coils, which are disposed in axial side-by-side relationship and/or radially superposed to define the structural component of the tyre.

Document DE202013101050U1 describes a method and an apparatus for calibrating in real time and guiding a multi-axis robotized articulated arm that, with its terminal member, moves along a predefined path, stored in the controller of the robot itself. The robotized articulated arm moves the terminal member along the path programmed during a reference movement by an executed experimentally process by supporting a test element belonging to an external control system. During the movement of the robot, the position and orientation of the test element are stored by an external measuring device, in particular an optical one, and by a control computer belonging to the control system. In this case, orientation and path errors are detected in real time and correction values are determined which are supplied to the robot controller. The external control system and/or the robot controller store the correction values, and movements are made in subsequent operations along the programmed path thus corrected, possibly without using the external control system.

The Applicant observes that the use of methods and apparatuses like those described in WO00/35666, wherein elementary semifinished products are used in order to form tyre components by deposition on a forming drum (which is substantially cylindrical or toroidal in shape) requires precision and accuracy when depositing the elementary semifinished product both because of the small dimensions of the elementary semifinished product itself and because of the variability of the trajectory that must be followed by the forming drum being moved by the robotized arm.

The Applicant has verified that inaccuracies may occur during the deposition phase due to the fact that the positions taken by the robotized arm, and hence by the forming drum, are not exactly those specified in the design specification.

More in detail, the Applicant has verified that control systems for anthropomorphic robotized arms permit movements characterized by a high degree of repeatability, while however lacking some precision. In other words, such control systems make movements that may be, over time, substantially identical to one another, but the final position may be different from the expected one.

The Applicant has also verified that the difference between the actual position taken by the anthropomorphic robotized arm and the expected one is not the same for all positions, but varies depending on the position considered.

From a practical viewpoint, the Applicant has observed that such a lack of precision may lead to errors in the positioning of the elementary semifinished products on the toroidal support, and may finally result in the production of tyres not complying with the high quality standards required.

The Applicant observes that the control technique described in DE202013101050U1 is not suitable for solving the above-mentioned problem. In fact, DE202013101050U1 describes a system for correcting the movement of a robotized arm based on "online" detection, through a dedicated measuring device, of the position of the terminal member of the robotized arm. The Applicant believes that such an approach cannot be effectively implemented in industrial contexts, such as, for example, deposition of elementary semifinished products on a forming drum for building tyres, because of the physical and computational complexity of the systems necessary to ensure continuous monitoring.

The Applicant also observes that, in case of stored corrections, document DE202013101050U1 teaches to operate along single paths repeated over time in an identical manner, so that any different paths, even developing in the same working zone, will require the execution of a phase for detecting and storing path correction values, which is a time-consuming and resource-intensive process.

The Applicant has thus perceived that, in order to be able to attain the required level of precision and accuracy while using limited time and resources, the adopted correction technique must be operational and effective starting from the deposition of the very first elementary semifinished product. Furthermore, said control technique must not be bound to a single path to be followed, so that it can be applied to different paths developing within the same working zone.

As perceived by the Applicant, said correction technique can be used, once it has been set up, for building different tyre models, manufactured by means of the same anthropomorphic robotized arm operating in said working zone.

Lastly, the Applicant has found out that the positions taken by the anthropomorphic robotized arm can be modified in advance by means of a previously stored correction function, associated with the anthropomorphic robotized arm and with one working zone.

More specifically, the Applicant has found out that target coordinates for the anthropomorphic robotized arm, aimed at moving a forming drum, preferably having a substantially cylindrical or toroidal shape, in the working zone, can be modified by means of said correction function, thereby obtaining corresponding processed coordinates, which are then used for sending movement commands to the anthropomorphic robotized arm, so as to attain the required deposition precision.

SUMMARY

In accordance with a first aspect, the invention relates to a method for building green tyres.

Preferably, it is envisaged to provide a forming drum.

Preferably, it is envisaged to provide at least one feeding apparatus configured for feeding an elementary semifinished product.

Preferably, provision is made to associate an anthropomorphic robotized arm with said forming drum.

Preferably, provision is made to send movement commands to said anthropomorphic robotized arm in order to move said forming drum in a working zone.

Preferably, said working zone is defined at an outlet area where an elementary semifinished product exits said feeding apparatus.

Preferably, said forming drum is moved in said working zone while said feeding apparatus is feeding said elementary semifinished product, so that said elementary semifinished product is laid on said forming drum in coils arranged side by side and/or at least partially overlapping each other for making at least one component of a green tyre of a given tyre model.

Preferably, in order to send said movement commands to said anthropomorphic robotized arm, provision is made to determine target coordinates for said anthropomorphic robotized arm in order to move said forming drum in said working zone.

Preferably, said target coordinates are associated with at least one component of said green tyre.

Preferably, in order to send said movement commands to said anthropomorphic robotized arm, provision is made to retrieve a correction function from a memory area.

Preferably, said correction function is associated with said anthropomorphic robotized arm.

Preferably, said correction function is associated with said working zone.

Preferably, in order to send said movement commands to said anthropomorphic robotized arm, provision is made to modify said target coordinates by means of said correction function, thereby obtaining processed coordinates.

Preferably, in order to send said movement commands to said anthropomorphic robotized arm, provision is made to use said processed coordinates for said movement commands.

The Applicant believes that, in this manner, a green tyre can be built with precision, repeatability and limited use of time and resources, thus obtaining finished tyres compliant with the respective specifications.

According to another aspect, the invention relates to a working station for deposition of elementary semifinished products for building green tyres.

Preferably, at least one feeding apparatus for feeding an elementary semifinished product is provided.

Preferably, a forming drum is provided.

Preferably, an anthropomorphic robotized arm associated with said forming drum is provided.

Preferably, a control apparatus is provided.

Preferably, said control apparatus is configured for sending movement commands to said anthropomorphic robotized arm in order to move said forming drum in a working zone.

Preferably, said working zone is defined at an outlet area where an elementary semifinished product exits said feeding apparatus.

Preferably, said forming drum is moved in said working zone while said feeding apparatus is feeding said elementary semifinished product, so that said elementary semifinished product is laid on said forming drum in coils arranged side by side and/or at least partially overlapping each other for making at least one component of a green tyre of a given tyre model.

Preferably, said control apparatus is configured for sending target coordinates for said anthropomorphic robotized arm in order to move said forming drum in said working zone.

Preferably, said target coordinates are associated with at least one component of said green tyre.

Preferably, said control apparatus is configured for retrieving from a memory area a correction function associated with said anthropomorphic robotized arm.

Preferably, said correction function is associated with said working zone.

Preferably, said control apparatus is configured for modifying said target coordinates by means of said correction function, thereby obtaining processed coordinates.

Preferably, said control apparatus is configured for using said processed coordinates in order to send said movement commands.

According to at least one of the above aspects, the present invention may have at least one of the following preferred features.

Preferably, a step is envisaged for defining said correction function.

Preferably, defining said correction function comprises defining a plurality of known positions having known coordinates.

Preferably, defining said correction function comprises moving said anthropomorphic robotized arm in a manner such that said anthropomorphic robotized arm will come to be, in succession, in determined positions, each one corresponding to a respective one of said known positions.

Preferably, defining said correction function comprises, when said anthropomorphic robotized arm is in each one of said determined positions, detecting acquired coordinates of said anthropomorphic robotized arm.

Preferably, defining said correction function comprises comparing the known coordinates of each one of said known positions with the acquired coordinates associated with the respective determined position.

Preferably, defining said correction function comprises calculating said correction function based on said comparison.

Preferably, comparing said known coordinates with said acquired coordinates comprises calculating a difference between the known coordinates of each one of said known positions and the acquired coordinates associated with the respective determined position.

Preferably, moving said anthropomorphic robotized arm comprises receiving displacement commands from a user.

Preferably, said displacement commands are issued by means of an external manual control device.

Preferably, calculating said correction function based on said differences comprises applying a fitting operation, more preferably by means of a minimization algorithm, executed on the differences between the acquired coordinates and the known coordinates.

Preferably, said target coordinates are at least partially different from the known coordinates of said known positions.

Preferably, one or more positions of said anthropomorphic robotized arm associated with said target coordinates can be reached with two or more different configurations of said anthropomorphic robotized arm.

Preferably, provision is made to select one of said two or more different configurations, on the basis of configurations of said anthropomorphic robotized arm used for bringing said anthropomorphic robotized arm into said determined positions.

Preferably, defining said plurality of known positions comprises providing a calibration device.

Preferably, defining said plurality of known positions comprises moving said calibration device so as to define said known positions.

Preferably, said calibration device comprises a base plate.

Preferably, said calibration device comprises a support rotatably mounted on said base plate.

Preferably, said calibration device comprises a reference element translatably mounted on said support.

Preferably, moving said calibration device comprises rotating said support relative to said base plate.

Preferably, moving said calibration device comprises translating said reference element along said support.

Preferably, moving said calibration device comprises rotating said support relative to said base plate and translating said reference element along said support.

Preferably, said reference element defines said known positions.

Preferably, said correction function is independent of said given tyre model.

Preferably, said correction function is a piecewise-defined function.

Preferably, each one of said pieces is associated with a different portion of said working zone.

Preferably, said correction function is defined differently in two or more of said pieces.

Preferably, said anthropomorphic robotized arm has at least five axes of rotation. More preferably, said anthropomorphic robotized arm has at least six axes of rotation.

Preferably, a calibration device is provided for calibrating said anthropomorphic robotized arm.

Preferably, said support can be positioned in a plurality of first positions relative to said base plate.

Preferably, said reference element can be positioned in a plurality of second positions relative to said support.

Preferably, by combining said first positions and said second positions, known positions are defined for calibrating said anthropomorphic robotized arm.

Preferably, first locking members are provided for removably locking said support relative to said base plate.

Preferably, second locking members are provided for removably locking said reference element relative to said support.

BRIEF DESCRIPTION OF THE DRAWINGS

Further features and advantages will become more apparent in the light of the following detailed description of a preferred but non-limiting embodiment of the invention. Reference will be made in the following description to the annexed drawings, which are also provided by way of illustrative and non-limiting example, wherein.

DETAILED DESCRIPTION

With reference to the annexed drawings, numeral 1 designates as a whole a working station for deposition of elementary semifinished products for building green tyres, wherein the present invention can be implemented.

Preferably, the working station 1 comprises at least one feeding apparatus 14 for feeding an elementary semifinished product 8.

More in particular, the feeding apparatus 14 is arranged to supply, through a respective feeding member 14*a*, the elementary semifinished product 8.

Figure 2:
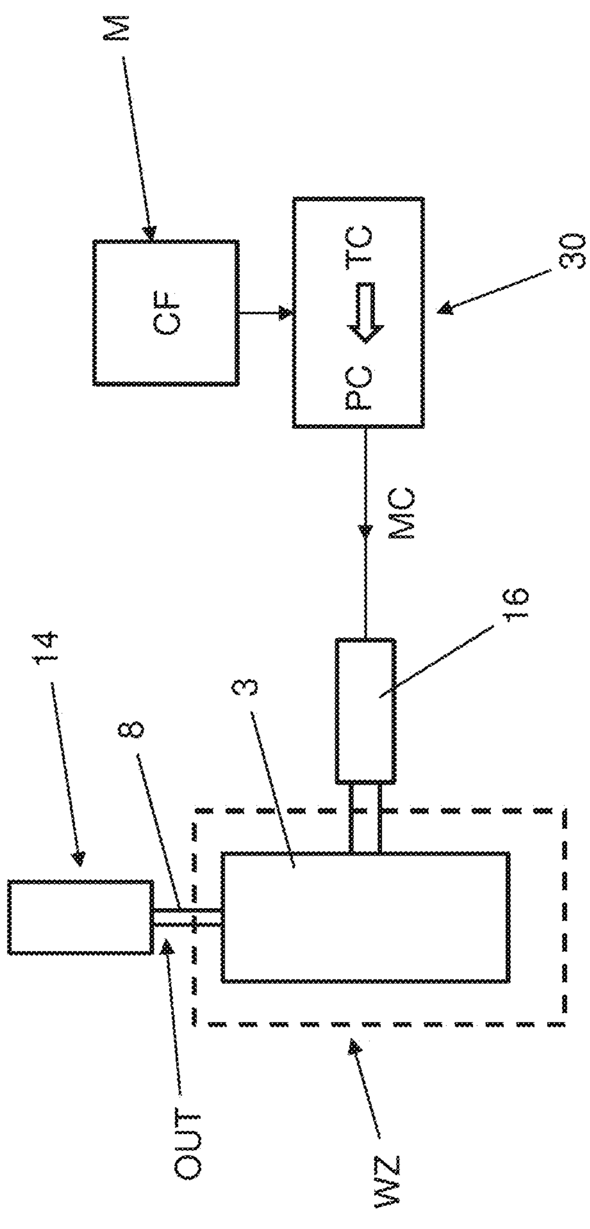
FIG. 2 shows a schematic representation of one aspect of the present invention.

At an outlet area OUT where the elementary semifinished product 8 exits the feeding apparatus 14, a working zone WZ is defined (FIG. 2).

Preferably, the working station 1 comprises also a forming drum 3. Preferably, the forming drum 3 has a substantially cylindrical or toroidal shape.

The forming drum 3 has a radially outer surface 3*a* whereon the elementary semifinished product 8 is laid for making one or more components of a green tyre.

Preferably, the working station 1 comprises a robotized arm associated with the forming drum 3. Preferably, said robotized arm is an anthropomorphic robotized arm 16. More preferably, the anthropomorphic robotized arm 16 has at least six axes of rotation.

Figure 1:
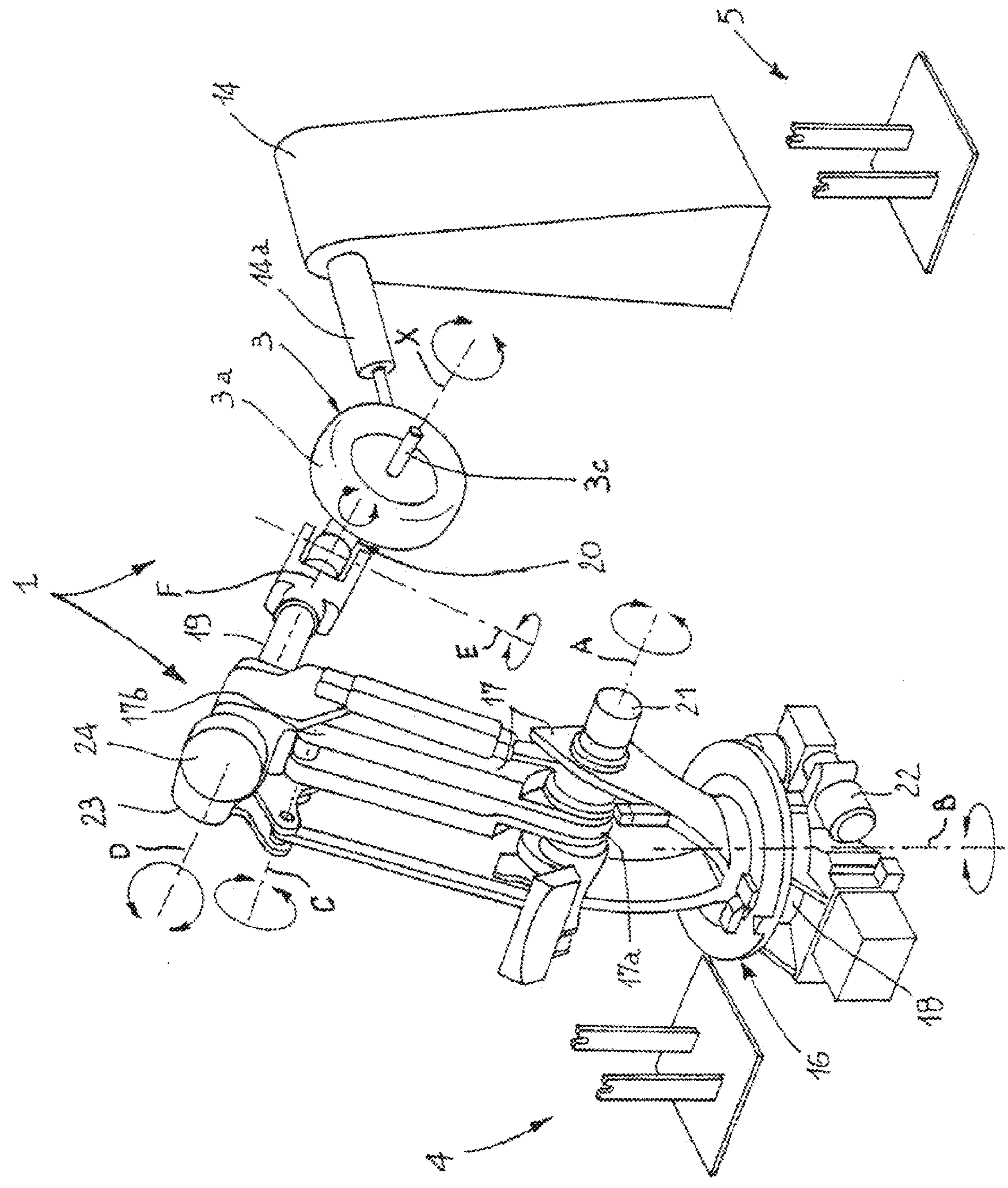
FIG. 1 schematically shows a working station, comprising an anthropomorphic robotized arm, wherein the invention can be implemented.

By way of example, the anthropomorphic robotized arm 16 shown in FIG. 1 has seven axes of rotation: “A”, “B”, “C”, “D”, “E”, “F”, “X”.

In particular, the anthropomorphic robotized arm 16 comprises a first section 17 having a first end 17*a* rotatably connected to a supporting platform 18 according to a first axis of oscillation “A” arranged horizontally, and a second axis “B” arranged vertically or anyway perpendicular to the first axis of oscillation “A”.

The anthropomorphic robotized arm 16 further comprises a second section 19 constrained to a second end 17*b* of the first section 17, with the possibility of oscillating about a third axis “C”, preferably parallel to the first axis “A”, and also about a fourth axis of oscillation “D”, perpendicular to the third axis “C” and preferably arranged longitudinally relative to the second section 19 itself.

A terminal head 20 adapted to removably engage the forming drum 3 is operationally associated with the end of the second section 19. With the terminal head 20 is associated, for example, a motor (not shown) that rotates a gripping element (also not shown) adapted to removably engage the forming drum 3 at a fitting shank 3*c* coaxially protruding on opposite sides of the latter.

The terminal head 20 can also oscillate about a fifth axis “E”, perpendicular to the fourth axis of oscillation “D”.

In a preferred embodiment, the fifth axis “E” is coplanar to the fourth axis “D”, and the terminal head 20 can also oscillate, driven by a respective motor (not shown), about a sixth axis “F” oriented perpendicularly relative to the forming drum 3 and also relative to the fifth axis of oscillation “E”.

The movements of the first section 17, of the second section 18 and of the terminal head 20 about the respective axes of oscillation “A”, “B”, “C”, “D” “E”, “F” are handled by respective motors, of which only those are visible in FIG. 1, designated by numerals 21, 22, 23, 24, which provide the movements about the first, second, third and fourth axes.

The motor for the movements about the fifth axis “E”, not shown in the drawing, can be implemented, just like the other motors, in any advantageous manner known to those skilled in the art.

Advantageously, the forming drum 3 is picked up by the anthropomorphic robotized arm 16 from a pick-up position 4. The anthropomorphic robotized arm 16 then carries the forming drum 3 near the feeding apparatus 14 for the deposition of the semifinished product 8. The forming drum 3 is finally laid into a deposition position 5.

In particular, the anthropomorphic robotized arm 16 is configured for moving the forming drum 3 in said working zone WZ while the feeding apparatus 14 is feeding the elementary semifinished product 8. In this way, the elementary semifinished product 8 is laid onto the radially outer surface 3*a* of the forming drum 3 in coils arranged side by side and/or at least partially overlapping each other, for making the at least one component of the green tyre.

More in detail, during the formation of the at least one component of the green tyre, the forming drum 3 remains engaged with the anthropomorphic robotized arm 16, which provides for orienting it appropriately with respect to the feeding apparatus 14 and for rotating it about the geometric axis “X” synchronously with the feeding apparatus 14, so as to accomplish the deposition of the elementary semifinished product 8.

The mobility of the forming drum 3 about the six axes of oscillation “A”, “B”, “C”, “D”, “E”, “F” and the rotation of the same about the geometric axis “X” allow the correct deposition of the elementary semifinished product 8 coming from the feeding apparatus 14.

Preferably, the working station 1 comprises a control apparatus 30 (FIG. 2).

The control apparatus 30 is configured for sending movement commands MC to the anthropomorphic robotized arm 16.

The movement commands MC cause the forming drum 3, mounted on the terminal head 20 of the anthropomorphic robotized arm 16, to move, in particular in the working zone WZ, while the feeding apparatus 14 is feeding the elementary semifinished product 8.

The control apparatus 30 may be implemented, for example, as a conventional computer suitably programmed for executing the operations described herein. Said movement commands MC are sent from the control apparatus 30 to the anthropomorphic robotized arm 16, i.e. to the internal control system of the anthropomorphic robotized arm 16, which then converts such movement commands MC into orientations of the individual tracts of the anthropomorphic robotized arm 16 about the respective axes of rotation.

Preferably, the control apparatus 30 is configured for managing target coordinates TC associated with the at least one component of the green tyre to be built.

In particular, the target coordinates TC are referred to a basic reference system integral with the feeding apparatus 14 and the outlet area OUT thereof.

In practical terms, the target coordinates TC are the coordinates where the anthropomorphic robotized arm 16 should be for the elementary semifinished product 8 to be deposited in accordance with the design specification.

Preferably, the target coordinates TC are determined a priori in the design phase depending on the tyre model to be manufactured, the specific component to be made, the relative positions of the anthropomorphic robotized arm and the feeding apparatus, etc.

For example, the target coordinates TC can be acquired by the control apparatus 30 by retrieving them from a respective memory area (not shown) or by receiving them from another electronic device.

Preferably, the target coordinates TC define a succession of positions in which the anthropomorphic robotized arm 16 must be, while the feeding apparatus 14 is feeding the elementary semifinished product 8, in order to make said at least one component of the green tyre.

However, when movement commands based on the target coordinates TC are sent to the anthropomorphic robotized arm 16, the desired movements are actually not obtained because of a number of errors/non-ideal conditions introduced by the anthropomorphic robotized arm 16 itself.

For this reason, the control apparatus 30 is configured to use a correction function CF, in order to bring the anthropomorphic robotized arm 16 into the actually desired positions.

Preferably, the control apparatus 30 is configured for retrieving the correction function CF from a memory area M.

The memory area M may be either integrated into the control apparatus 30 or connected to the control apparatus 30.

The correction function CF is associated with the anthropomorphic robotized arm 16 and the working zone WZ.

Preferably, the correction function CF is descriptive of a difference between the target coordinates TC and the coordinates (different from the coordinates TC due to the above reasons) where the anthropomorphic robotized arm 16 would come to be if it received movement commands based on the target coordinates TC.

Further details about the correction function CF will be provided hereinafter.

The control apparatus 30 is preferably configured for applying the correction function CF to the target coordinates TC, thereby obtaining corresponding processed coordinates PC.

Preferably, the control apparatus 30 is configured to use the processed coordinates PC for sending the movement commands MC to the anthropomorphic robotized arm 16.

In practice, the processed coordinates PC are the coordinates that must be used for controlling the anthropomorphic robotized arm 16 in such a way as to ensure that the latter will actually be in the desired positions.

Referring back to the correction function CF, it is preferably independent of the tyre model to be manufactured.

Preferably, the correction function CF is independent of the target coordinates TC.

In particular, the correction function CF is independent of the particular trajectory or movement that the anthropomorphic robotized arm 16 must follow while the feeding apparatus 14 is feeding the elementary semifinished product 8.

The correction function CF is therefore valid for substantially any movement that the anthropomorphic robotized arm 16 may make within the working zone WZ.

In one embodiment, the correction function CF is a piecewise-defined function. In particular, each piece in which the correction function CF is defined is associated with a different portion of said working zone WZ, and the correction function CF is preferably defined differently in each piece. Such a solution may be useful, for example, when the anthropomorphic robotized arm 16 has to operate in a large working zone WZ with quite a long distance from one portion to another: a different definition of the correction function CF in each portion will improve the precision of the movements of the anthropomorphic robotized arm 16 within the same working zone WZ, as large as it may be.

Preferably, provision is made to define the correction function CF, in particular by means of the control apparatus 30.

Advantageously, the definition—i.e. the calculation—of the correction function CF occurs in an initial phase, before starting to use the anthropomorphic robotized arm 16 for the deposition of the elementary semifinished product 8.

Once the correction function CF has been defined, it can then be used as long as the anthropomorphic robotized arm 16 has to operate in the working zone WZ. In other words, the correction function CF will not have to be re-defined at every change of tyre model to be manufactured or component to be made.

Preferably, the correction function CF may be modified, for example, whenever the anthropomorphic robotized arm, which is inevitably subject to wear, will make unacceptable errors again. Preferably, said action of modifying the correction function CF is carried out with a smaller number of points than necessary for its first definition.

Preferably, the correction function CF is defined prior to associating the forming drum 3 with the anthropomorphic robotized arm 16.

Preferably, in order to define the correction function CF, a plurality of known positions KP having known coordinates KC are defined.

Figure 3:
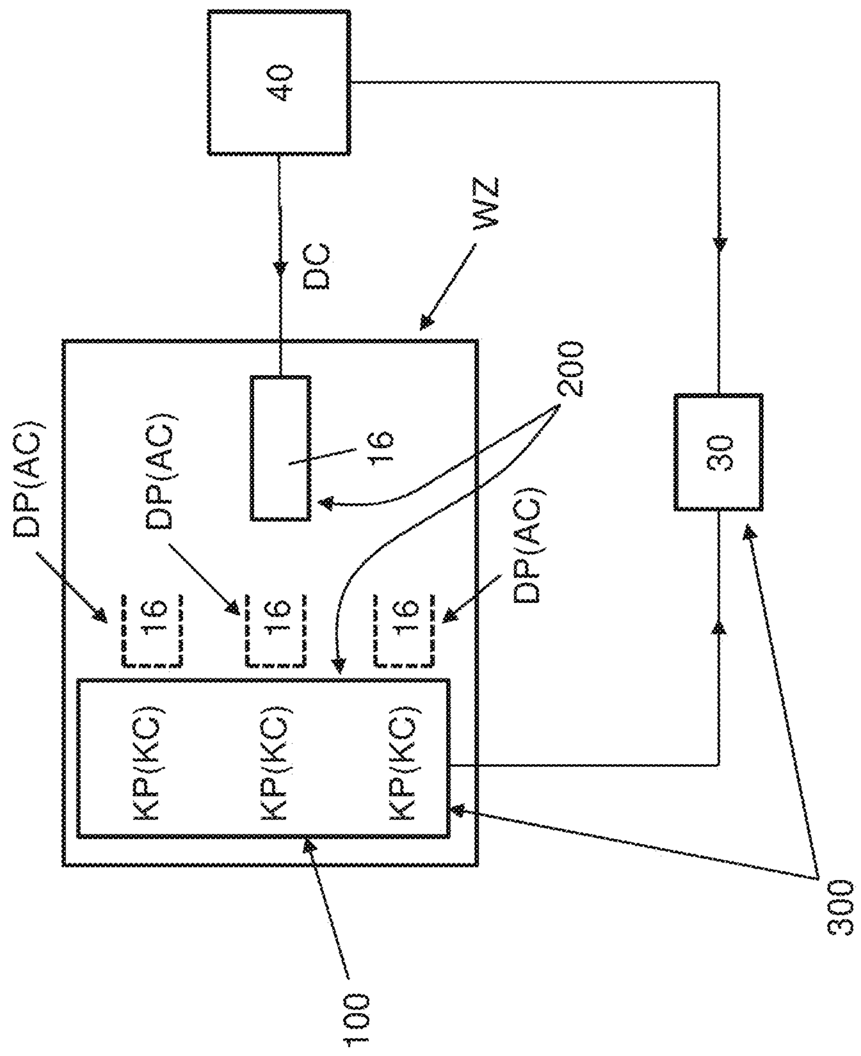
FIG. 3 shows a schematic representation of some operations that can be executed when implementing the invention.

Preferably, the known coordinates KC are defined with reference to said basic reference system associated with the outlet area OUT of the feeding apparatus 14 (FIG. 3).

In order to define such known positions KP, it is conveniently possible to employ a calibration device 100, schematically shown in FIGS. 4-7, which will be described more in detail hereinafter.

In practical terms, the known coordinates KC of the known positions KP are directly measured in space by means of instruments ensuring sufficient precision, e.g. with a maximum error equal to one third of the error that should be considered as tolerable during the use of the anthropomorphic robotized arm 16 for building said at least one component of the green tyre.

When the calibration device 100, or another device capable of mechanically and geometrically defining the known positions KP, is used, the precision of the known coordinates KC is guaranteed by the geometric precision with which the device has been made.

Each known position KP is defined in a respective definition operation.

Once a known position KP has been defined, i.e. at the end of every definition operation, the anthropomorphic robotized arm 16 is moved in a manner such that it will come to be in a determined position DP, corresponding to said known position KP.

Therefore, the anthropomorphic robotized arm 16 is moved in a manner such that it will come to be, in succession, in the determined positions DP, each one corresponding to a respective known position KP. In FIG. 3 the anthropomorphic robotized arm 16 is represented schematically by means of dashed lines when it is in the determined positions DP.

Preferably, the anthropomorphic robotized arm 16, before it makes these movements, is fitted at its free end with a tip or another suitable element. The anthropomorphic robotized arm 16 is then moved in a manner such that the point of said tip will come to be, in succession, in the determined positions DP, i.e. it will "touch" each one of the known positions KP.

In order to make these movements, the anthropomorphic robotized arm 16 preferably receives movement commands DC from a user. In particular, such movement commands DC may be issued by means of an external manual control device 40, such as, for example, a so-called "teach pendant".

When the anthropomorphic robotized arm 16 is in each one of the determined positions DP, acquired coordinates AC of the anthropomorphic robotized arm 16 are detected.

In very practical terms, this means determining where the anthropomorphic robotized arm 16 "thinks it is", while it is actually in a different position, i.e. in one of the known positions KP having known coordinates KC.

Once the anthropomorphic robotized arm 16 has been brought into all of the determined positions DP, and all of the acquired coordinates AC have been detected, a difference is calculated between the known coordinates KC of each one of the known positions KP and the acquired coordinates AC associated with the respective determined position DP. Based on these differences, the correction function CF is then calculated.

The correction function CF is thus extrapolated starting from discrepancies, detected at discrete points—i.e. in said known positions KP—between the known coordinates KC and the acquired coordinates AC. Therefore, the correction function CF is preferably continuous within the working zone WZ.

When it is piecewise-defined, the correction function CF is preferably substantially continuous in each piece. The various pieces may be either contiguous or separate from one another.

In order to define the correction function CF, it is possible to apply, preferably by means of a minimization algorithm, a fitting operation executed on the differences between the acquired coordinates AC and the known coordinates KC.

It should be noted that, advantageously, the known coordinates KC of the known positions KP are at least partly different from the target coordinates TC that must be considered in operation. In this way, the correction function CF operates also on points other than those used for the definition of the correction function CF itself, coherently with the fact that the correction function CF can be used throughout the working zone WZ.

Preferably, prior to defining said known positions KP in space and having the anthropomorphic robotized arm 16 reach them, said basic reference system is defined.

For this purpose, at least three points are defined in space. Said at least three points locate two axes and one origin in a plane in space, which define a three-dimensional reference system (the third axis is univocally defined as a vector orthogonal to the first two axes).

In order to allow the anthropomorphic robotized arm 16 to locate said basic reference system, the anthropomorphic robotized arm 16 itself is guided in a manner such that it will come to "touch" each one of the points that define the basic reference system. This operation, as previously described, can be advantageously carried out by means of the external manual control device 40.

Through said location operation, the anthropomorphic robotized arm 16 defines an internal reference system of its own, which reflects (i.e. is a virtual copy of) said basic reference system.

Preferably, the acquired coordinates AC are referred to the internal reference system of the anthropomorphic robotized arm 16.

Once the basic reference system has been acquired (i.e. a virtual copy thereof has been made) by the anthropomorphic robotized arm 16, the above-described procedure for locating the known positions KP is carried out.

The number of known positions KP that are used for defining the correction function CF may vary depending on several factors.

Merely by way of example, 10-30 known positions KP may be considered.

Preferably, the known positions KP are distributed throughout the working zone WZ, e.g. according to a pattern substantially describing a grid.

In one embodiment, one or more positions of the anthropomorphic robotized arm 16 associated with the target coordinates TC can be reached with two or more different configurations of the anthropomorphic robotized arm 16 itself.

This is due to the fact that the anthropomorphic robotized arm 16, since it theoretically can arrange itself in various configurations, can typically reach a given position with two or more different configurations.

Therefore, a selection operation is preferably envisaged, wherein one of said two or more different configurations is selected. The selection is made on the basis of configurations of the anthropomorphic robotized arm 16 used for bringing the anthropomorphic robotized arm 16 into the determined positions DP.

In other words, during the procedure of defining the correction function CF, and in particular during the positioning of the anthropomorphic robotized arm 16 into of the determined positions DP, choices can be made as to which configuration, of two or more possible configurations, should be used in order to reach one of the determined positions DP. This selection is stored and then used for making similar selections in operation—i.e. while moving the forming drum 3 in front of the feeding apparatus 14.

FIGS. 4-7 schematically show a calibration device 100 that can be used within the scope of the present invention.

In particular, the calibration device 100 is moved and configured in such a way as to define said known positions KP and, preferably, the points for the definition of said basic reference system.

Preferably, the calibration device 100 comprises a base plate 110. As schematically shown in FIGS. 4-7, the base plate 110 may have a substantially semicircular profile.

Preferably, the base plate 110 has first holes 111.

Preferably, said first holes 111 are arranged according to a first sequence 111*a* and a second sequence 111*b*.

Preferably, the first sequence 111*a* and the second sequence 111*b* follow respective arched profiles. Preferably, such arched profiles are substantially parallel to each other.

Preferably, the first holes 111 of the first sequence 111*a* are angularly equidistant from each other.

Preferably, the first holes 111 of the second sequence 111*b* are angularly equidistant from each other.

Preferably, the base plate 110 is also equipped with at least three seats 112*a*, 112*b*, 112*c*, each one adapted to receive a respective reference member 113*a*, 113*b*, 113*c*.

Advantageously, the reference members 113*a*, 113*b*, 113*c* can be removably mounted in said seats 112*a*, 112*b*, 112*c*.

Figure 6:
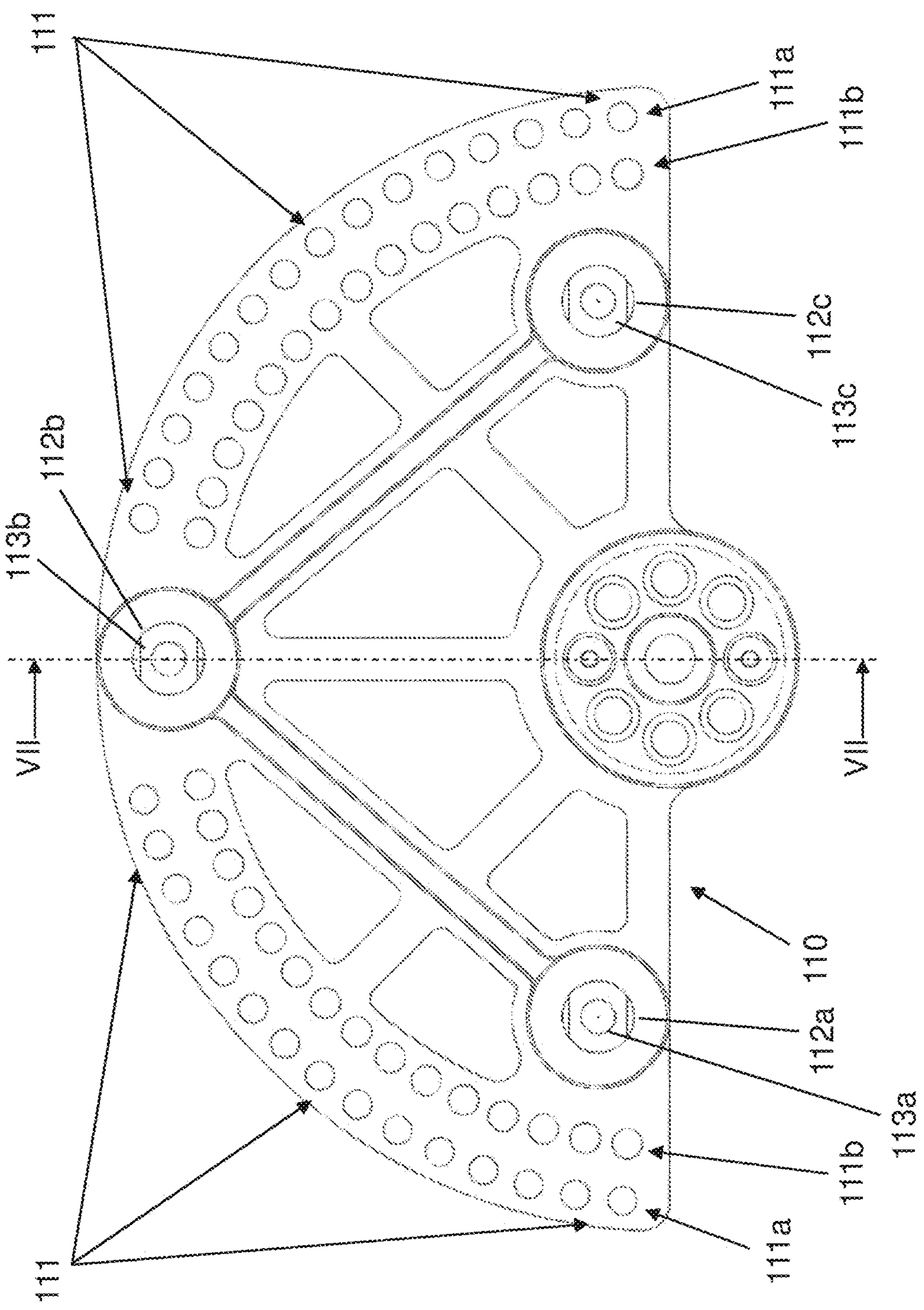
FIG. 6 shows a front view of a component of the device of FIG. 4 in a given operating configuration.
Figure 7:
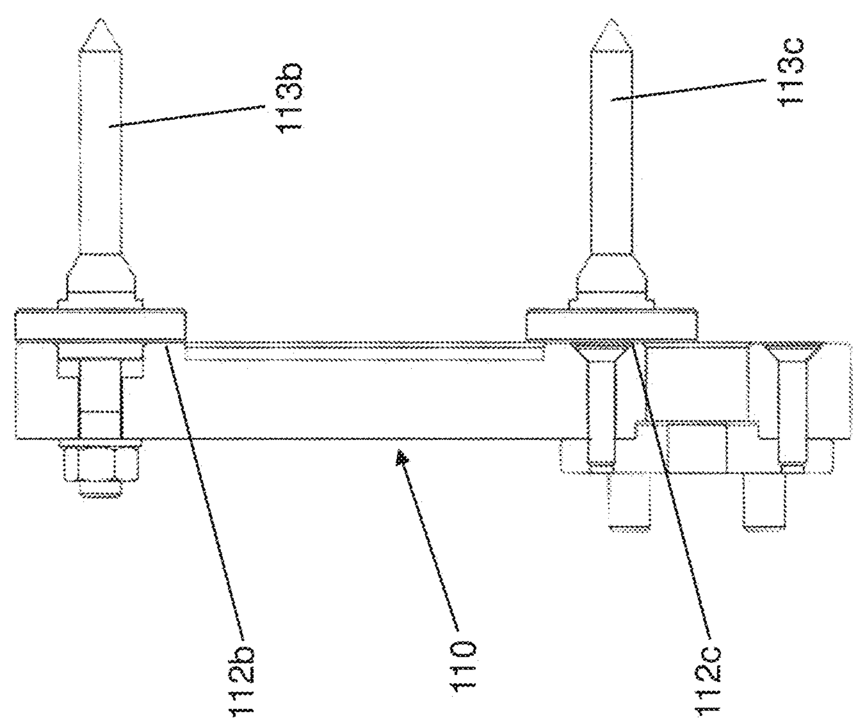
FIG. 7 shows a sectional view of the device of FIG. 6, along the plane defined by line VII-VII in FIG. 6.

By way of example, the reference members 113*a*, 113*b*, 113*c* may be provided in the form of tips, as schematically shown in FIGS. 6-7.

The calibration device 100 further comprises a support 120.

The support 120 is rotatably mounted on the base plate 110.

The support 120 can thus take a plurality of first positions relative to the base plate 110.

Preferably, the calibration device 100 comprises first locking means 100*a*, for removably locking the support 120 relative to the base plate 110.

Preferably, the support 120 substantially has a plate-like shape, with a substantially rectangular profile.

Preferably, the support 120 is hinged to the base plate 110 at a substantially central portion of a major side of said substantially rectangular profile.

The point where the support 120 is hinged to the base plate 110 preferably defines the centre of the arched profiles followed by the first sequence 111*a* and second sequence 111*b* of first holes 111.

The support 120 has at least one second hole 121.

The second hole 121 is so positioned as to face towards the first holes 111 when the support 120 progressively rotates relative to the base plate 110, and takes different first positions.

In particular, the second hole 121 is so positioned as to face towards the first holes 111 of the first sequence 111*a* or the first holes 111 of the second sequence 111*b*.

Preferably, the support 120 has at least one third hole 122.

In particular, the second hole 121 may face towards the first holes 111 of the first sequence 111*a*, and the third hole 122 may face towards the first holes 111 of the second sequence 111*b*.

Figure 4:
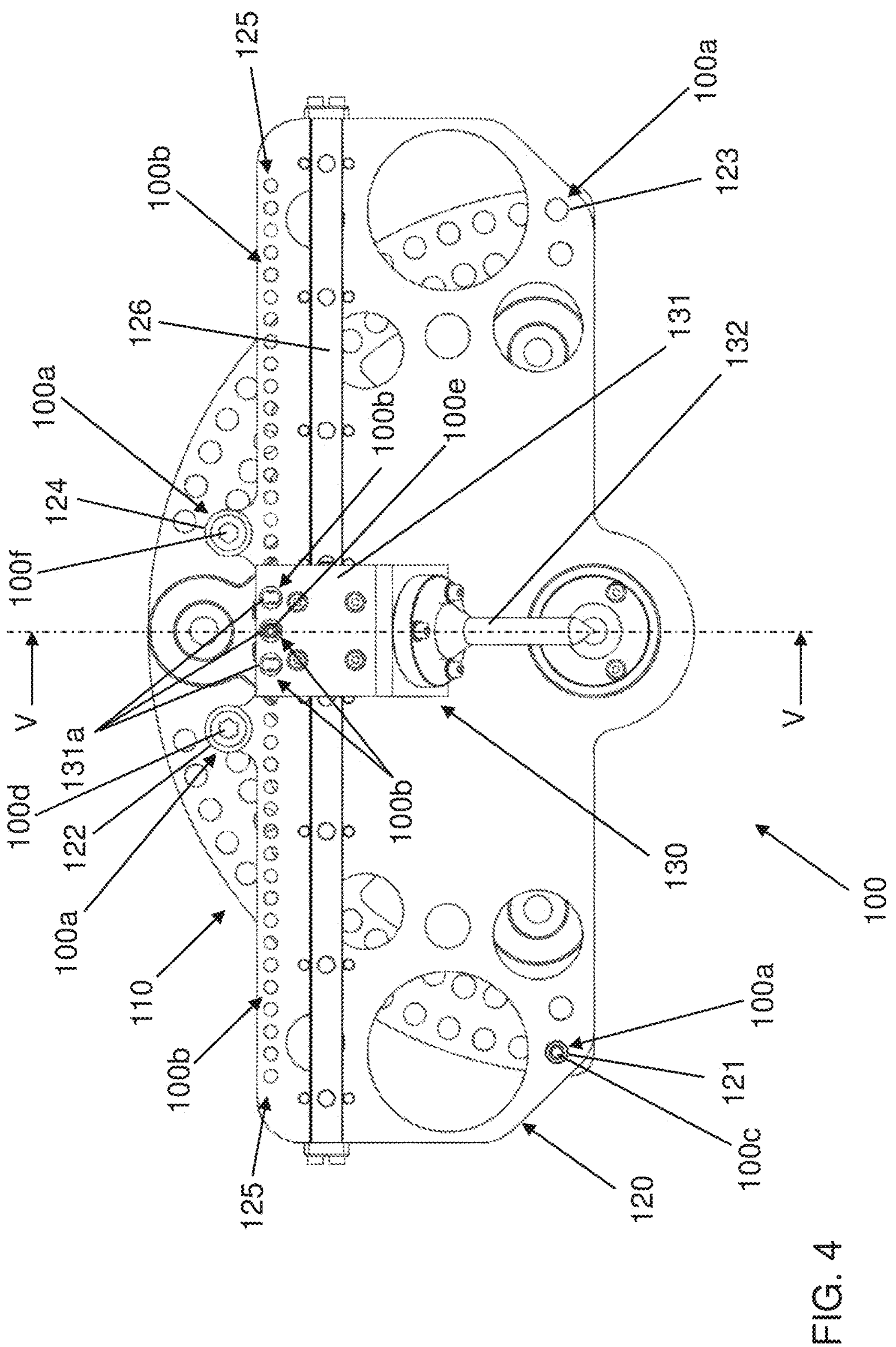
FIG. 4 shows a front view of a calibration device that can be used when implementing the invention.
Figure 5:
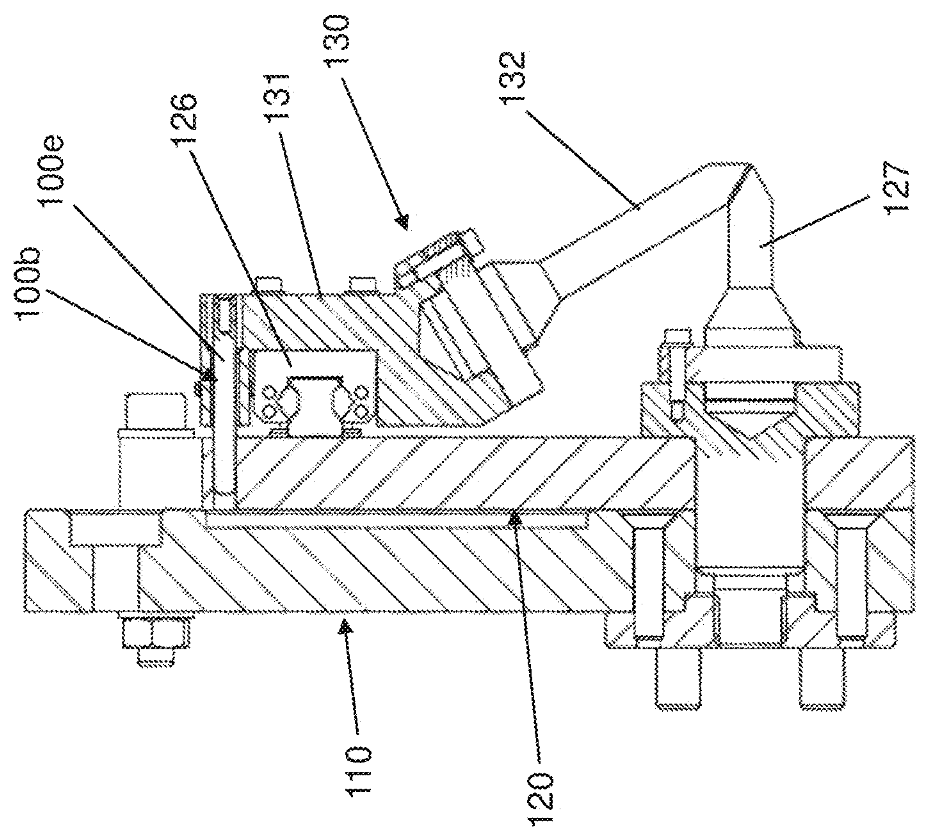
FIG. 5 shows a sectional view of the device of FIG. 4, along the plane defined by line V-V in FIG. 4.

In the embodiment shown in FIGS. 4-5 there are also a fourth hole 123 and a fifth hole 124, which are respectively analogous to the second hole 121 and the third hole 122.

Preferably, the support 120 also has a plurality of sixth holes 125.

Preferably, the sixth holes 125 follow a substantially straight profile.

Preferably, the sixth holes 125 are equidistant from each other.

In order to fix the support 120 in one of said first positions, a pin or a screw 100*c*, 100*d* is inserted through the second hole 121 and/or the third hole 122, until it also engages one of the first holes of the base plate 110.

In a preferred embodiment, respective screws 100*d*, 100*f* are inserted into the third hole 122 and/or into the fifth hole 124, so as to lock the support 120 in rotation and also eliminate any slack in the axial direction (i.e. orthogonal to the planar extension of the base plate 110). The axial constraint may be further reinforced by a fastening member mounted at the hinge between the support 120 and the plate 110.

Into the second hole 121 or the fourth hole 123 (which, except when the base plate 110 and the support 120 are arranged as shown in FIG. 4, are used alternatively) pins are inserted, which contribute to the fixing in the radial direction. FIG. 4 shows, by way of example, the pin 100*c* inserted in the second hole 121.

In order to move the support 120 into another one of the first positions, it is then sufficient to remove the pins and the screws, so that the support 120 can rotate again relative to the base plate 110.

The first locking members 100*a* may thus comprise the first holes 111, the second hole 121, the third hole 122, the fourth hole 124, the fifth hole 125 and the pins/screws 100*c*, 100*d*, 100*f* inserted therein.

The calibration device 100 further comprises a reference element 130.

Preferably, the reference element 130 is translatably mounted on the support 120.

Preferably, the reference element 130 can take a plurality of second positions relative to the support 120.

Preferably, the calibration device 100 comprises second locking means 100*b*, for removably locking the reference element 130 relative to the support 120.

More in detail, a substantially straight guide 126 is fastened on the support 120, which guide preferably extends along a major side of the rectangular profile of the support 120. The reference element 130 is slidably mounted on said guide 126.

Preferably, the guide 126 is substantially parallel to the straight profile along which the sixth holes 125 extend.

Preferably, the reference element 130 comprises a cursor 131, constrained to said guide 126, and a tip 132, integral with said cursor 131.

Preferably, the cursor 131 has one or more slots 131*a*.

In the embodiment shown in FIGS. 4-5, the cursor 131 has three slots 131*a*.

Preferably, the slots 131*a* are equidistant from each other.

Preferably, the distance between two adjacent slots 131*a* is different from the distance between two adjacent sixth holes 125.

The slots 131*a* are so arranged as to face towards the sixth holes 125 as the cursor progressively moves along the guide 126 and takes its second positions. This allows for a greater number of possible second positions, given a certain length of the guide 126. In other words, this allows increasing the density of second positions of the reference element 130 along the guide 126.

In order to fix the reference element 130 into one of said second positions, at least one pin or screw 100*e* is inserted into one of the slots 131*a* and into the sixth hole 125 that faces towards it.

The second locking members 100*b* may thus comprise the sixth holes 125, the slots 131*a* and the pins/screws 100*e* inserted therein.

Preferably, the calibration device 100 comprises an auxiliary tip 127, which can be mounted at the hinge between the base plate 110 and the support 120.

The auxiliary tip 127 allows verifying that the reference element 130 is correctly sliding on the guide 126—at least in a substantially central portion thereof.

It should be noted that the anthropomorphic robotized arm 16 and the calibration device 100 are parts of a calibration system 200 (FIG. 3), which preferably constitutes one aspect of the present invention.

It should also be noted that the control apparatus 30, preferably in combination with the calibration device 100, forms a control system 300 (FIG. 3), which may constitute one aspect of the present invention.

When in use, the calibration device 100 can be fixed either at the outlet area OUT, thus being integral with the feeding apparatus 14, or at the free end of the anthropomorphic robotized arm 16.

The following will describe a modality of use of the calibration device 100, wherein the latter is fixed at the outlet area OUT. Note that wholly analogous operations can be carried out by fixing the calibration device 100 at the free end of the anthropomorphic robotized arm 16.

The calibration device 100 is preferably used, during an initial phase, for defining said basic reference system.

For this purpose, the reference members 113*a*, 113*b*, 113*c* are mounted onto the base plate 110.

The anthropomorphic robotized arm 16 is fitted with a terminal element, such as, for example, a tip wholly similar to the reference members 113*a*, 113*b*, 113*c*.

The anthropomorphic robotized arm 16 is then moved manually, e.g. by means of said external manual control device 40, so that it will touch, with its terminal element, the point of each one of the reference members 113*a*, 113*b*, 113*c*.

The basic reference system is thus acquired, and the reference members 113*a*, 113*b*, 113*c* can then be removed from the base plate 110.

It should be noted that, when the reference members 113*a*, 113*b*, 113*c* are mounted on the base plate 110, the support 120 stays rotated by about 180° relative to the position shown in FIG. 4, so as to not interfere with the mounting/dismounting of the reference members 113*a*, 113*b*, 113*c* themselves and with the definition of the basic reference system.

For simplicity, the support 120 is not shown in FIGS. 6-7. Actually the support 120 is present, but, as aforesaid, it has been rotated so as to not interfere with the activities involving the reference members 113*a*, 113*b*, 113*c*.

After the reference members 113*a*, 113*b*, 113*c* have been removed, the support 120 is brought into a position that is equal or similar to the one shown in FIG. 4.

From there, by moving the support 120 and the reference element 130, said known positions KP are defined. In particular, such positions are located by the point of the tip 132, by combining the first positions of the support 120 and the second positions of the reference element 130.

The movement of the support 120 relative to the base plate 110 up to a given first position and the movement of the reference element 130 relative to the support 120 up to a given second position are parts of a respective definition operation as previously described.

The spatial coordinates of the known positions KP are defined by the position (which is known) in which the calibration device 100 is mounted and by the geometry (which is also known) of the calibration device 100 itself.

The known positions KP thus defined can be used by the anthropomorphic robotized arm 16 to reach the corresponding determined positions DP, as previously described, so as to come to the definition of the correction function CF.

Once all detections necessary for the calibration have been made, the calibration device 100 is removed, and the anthropomorphic robotized arm 16 is fitted with the operating member (the so-called "end effector") necessary for establishing a constraint with the forming drum 3.

It should be noted that in the present description specific reference has been made to a working station 1 for deposition of elementary semifinished products for building green tyres. However, the calibration method (i.e. the obtainment of the correction function CF), the calibration device 100 and the method for controlling the anthropomorphic robotized arm 16 on the basis of the correction function CF can also be used within other contexts, whenever it is necessary to operate an anthropomorphic robotized arm with particular precision along different trajectories.

The invention claimed is:

1. A working station for deposition of elementary semifinished products for building green tyres, said working station comprising:

- at least one feeding apparatus for feeding an elementary semifinished product;
- a forming drum;
- an anthropomorphic robotized arm associated with said forming drum;
- a control apparatus configured for sending movement commands to said anthropomorphic robotized arm in order to move said forming drum in a working zone, said working zone being defined at an outlet area where said elementary semifinished product exits said feeding apparatus, said forming drum being moved in said working zone while said feeding apparatus is feeding said elementary semifinished product, so that said elementary semifinished product is laid on said forming drum in coils arranged side by side or at least partially overlapping each other for making at least one component of the green tyre of a given tyre model; and
- a calibration device for calibrating said anthropomorphic robotized arm, the calibration device comprising:
  - a base plate,
  - a support rotatably mounted on said base plate, and
  - a reference element translatably mounted on said support, the reference element comprising a cursor and a tip;
- wherein the support is positionable in a plurality of first positions relative to the base plate and the reference element is positionable in a plurality of second positions relative to the support and is fixed into one position of the plurality of second positions by inserting at least one pin or screw into one slot of a plurality of slots on the cursor; and
- wherein said control apparatus is also configured for executing the following operations:
  - determining target coordinates, associated with said at least one component of said green tyre, for said anthropomorphic robotized arm in order to move said forming drum in said working zone;
  - retrieving from a memory area a correction function associated with said anthropomorphic robotized arm and said working zone;
  - modifying said target coordinates by means of said correction function, thereby obtaining processed coordinates;
  - using said processed coordinates for sending said movement commands.

2. The working station according to claim 1, wherein said anthropomorphic robotized arm has at least six axes of rotation.

3. The working station according to claim 1, wherein said correction function is independent of said given tyre model.

4. The working station according to claim 1, wherein, by combining said first positions and said second positions, known positions are defined for calibrating said anthropomorphic robotized arm.

5. The working station according to claim 1, wherein said calibration device comprises locking members for removably locking said support relative to said base plate.

6. The working station according to claim 1, wherein said calibration device comprises locking members for removably locking said reference element relative to said support.

* * * * *